Nov. 26, 1935.   C. A. KNUUTILA   2,022,043
FLOWER STEMMING MACHINE
Filed Dec. 5, 1933   3 Sheets-Sheet 2
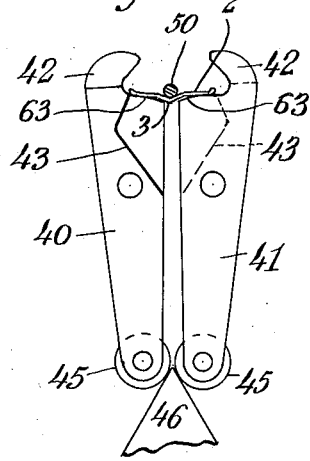
Fig. 5
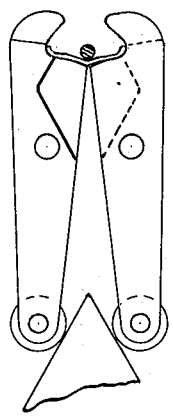
Fig. 6
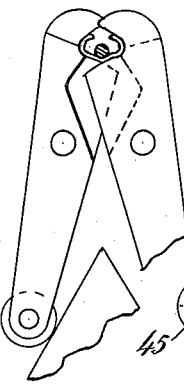
Fig. 7
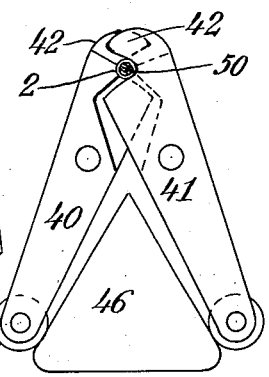
Fig. 8
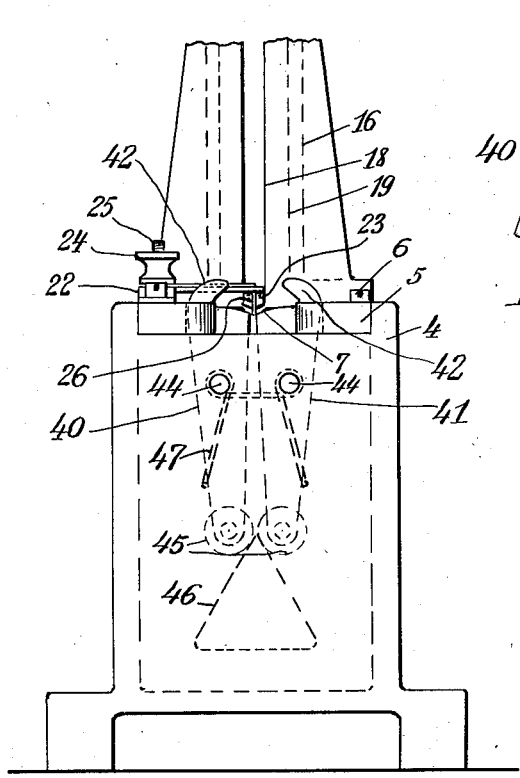
Fig. 4
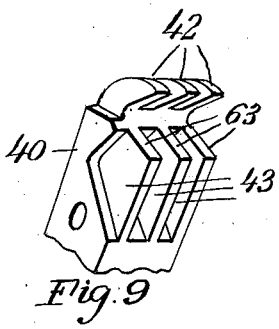
Fig. 9
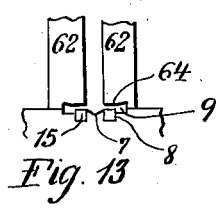
Fig. 13
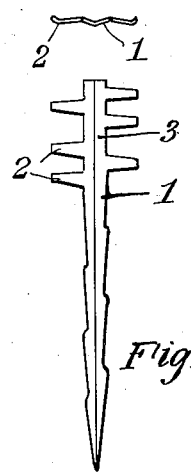
Fig. 14
Fig. 15
Charles A. Knuutila
INVENTOR.
BY Ivar E. A. Konigsberg
ATTORNEYS.

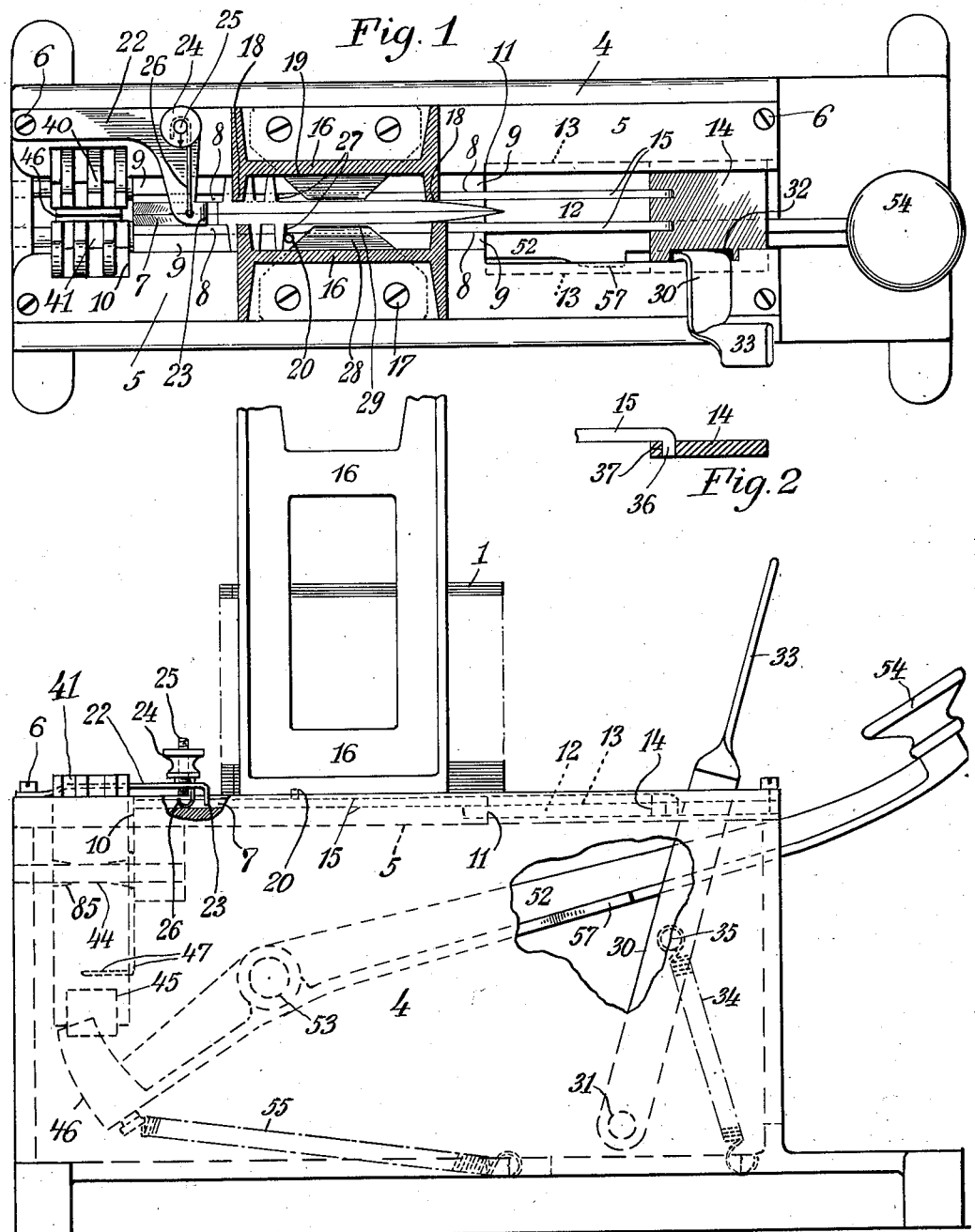

Nov. 26, 1935.      C. A. KNUUTILA      2,022,043
FLOWER STEMMING MACHINE
Filed Dec. 5, 1933      3 Sheets-Sheet 3
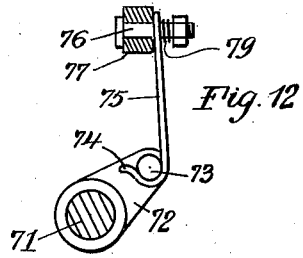
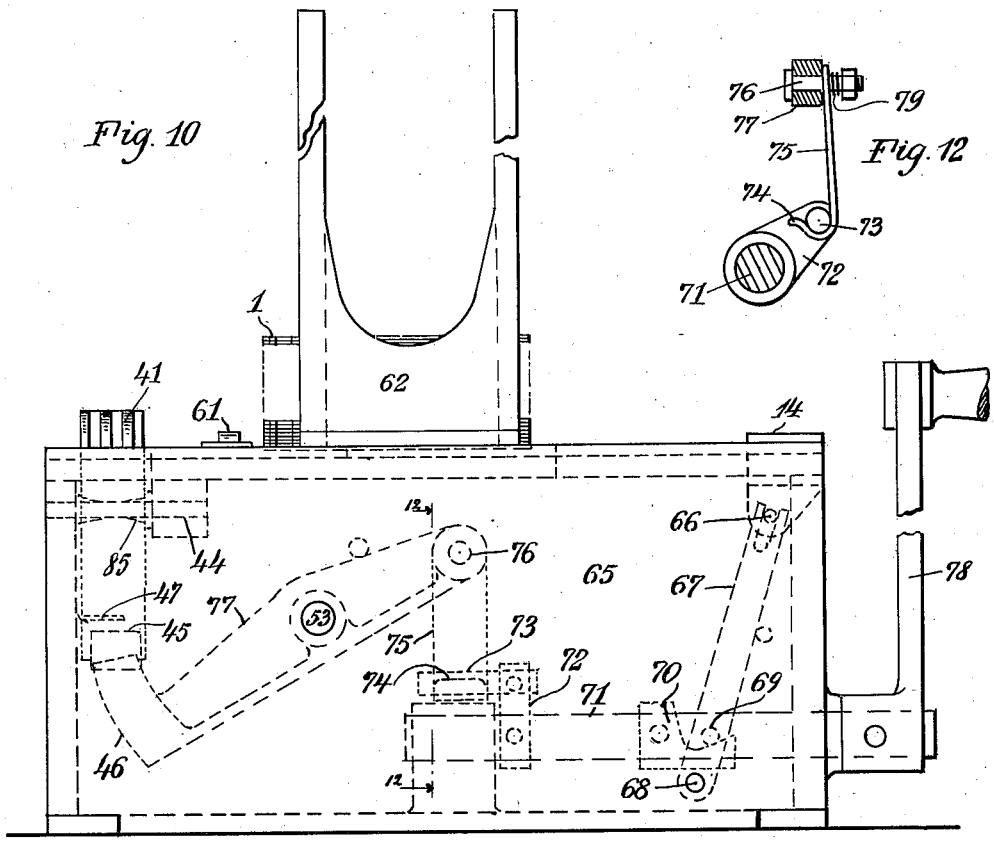
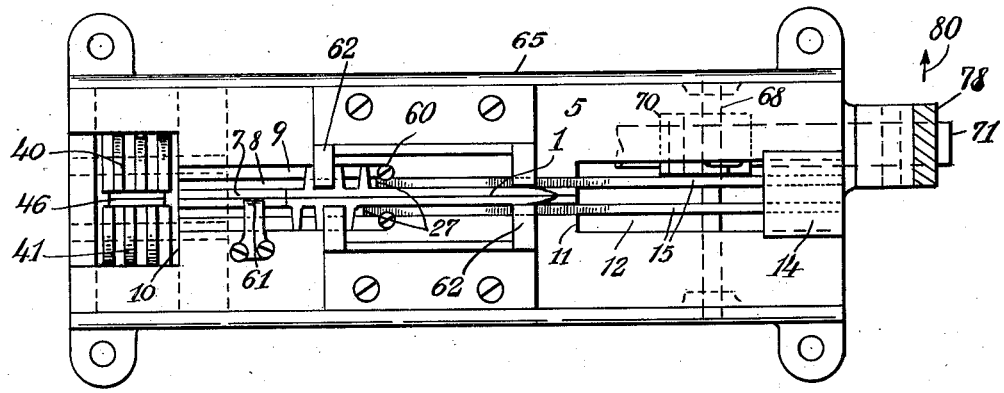
INVENTOR.
Charles A. Knuutila
BY
Ivan E. A. Konigsberg
ATTORNEYS.

Patented Nov. 26, 1935

2,022,043

UNITED STATES PATENT OFFICE 2,022,043

FLOWER STEMMING MACHINE

Charles A. Knuutila, Newark, N. J.

Application December 5, 1933, Serial No. 701,085

5 Claims. (Cl. 153—1)

The object of this invention is to provide a machine for stemming flowers, that is a machine for automatically attaching an artificial flower stem to the stem of a natural or artificial flower for the purpose of lengthening and strengthening the flower stem so that it may be conveniently manipulated in making up floral pieces and designs.

More particularly the object of my invention is to provide an efficient inexpensive machine for attaching flower picks of the type disclosed in my U. S. Patent No. 1,922,165 dated August 15, 1933, the application of which was filed December 8, 1931. Most of the features of this present application are disclosed in said flower pick application.

Another object of this invention is to provide a machine whereby it becomes possible to stem flowers automatically in an entirely novel manner which to my knowledge has never heretofore been attempted and which has not heretofore been known in the art. Artificial flower stems are, however, widely used but are affixed by manual operation.

Accordingly my invention is embodied in a novel flower stemming machine which is arranged and constructed and which contains the novel features hereinafter explained while reference is had to the accompanying drawings in which Fig. 1 is a plan view of a flower stemming machine embodying my invention with parts in section and parts omitted.

Fig. 2 is a detail view, showing the manner in which the pusher rods are secured.

Fig. 3 is a side view of the machine with parts broken away and parts in section.

Fig. 4 is a front end view of the machine with parts broken away and details omitted.

Figs. 5, 6, 7, and 8 are detail views of the closing jaws in different steps of operation.

Fig. 9 is a detail perspective view of a part of a jaw.

Fig. 10 is a side view of the machine, showing a modification with parts broken away.

Fig. 11 is a plan view of the machine shown in Figure 10.

Fig. 12 is a detail view on line 12—12 in Figure 10.

Fig. 13 is a detail view of parts of Figure 10.

Fig. 14 is an end view of the flower pick.

Fig. 15 is a view of the flower pick.

Referring now first to Figures 14 and 15, the flower pick which the machine operates upon consists of a V-shaped stem 1 provided with spaced staggered fingers 2 on opposite sides near the head 3 of the pick. The picks in bundles or stacks are placed in the machine, the lowermost pick is then pushed out from under the stack of picks with the fingered head foremost. The stem of the flower is placed upon the head and thereafter the fingers are wrapped around the flower stem by the action of suitable jaws in the machine.

Referring now to Figures 1–4, the machine 10 consists of a base 4 to which is secured a bed plate 5 by screws 6. The bed plate has a centrally disposed longitudinal V-shaped groove 7 and two feed grooves or channels 8, 8 one on each side of the groove 7. Outside the channels 8 there are two finger ways 9, 9. These channels and ways extend from the point 10 at the front of the machine to the point 11. The latter point marks the forward end of a cut out 12 which has undercut grooves 13 on each side and in which slides a flat block 14. The latter carries two pusher rods 15 which move in the aforesaid feed grooves 8 to push the flower pick out into flower stem receiving position.

The flower picks are stacked in the machine in a magazine which is composed of two uprights 16, 16. They are secured to the bed plate 5 by screws 17 and are positioned to receive and enclose the stacks of flower picks 1 so that the lowermost pick comes to rest in the position shown in Figure 1 of the drawings where it will be seen that the V-shaped stem of the picks rests in the V-shaped groove of the bed plate with its fingers extending to both sides into the finger ways 9. The detailed shape of the flower pick is not shown in Figure 1 for the sake of clearness in the drawing. The magazine uprights 16 have guiding flanges 18 which engage between the foremost pair of fingers 2. The inside walls 19 of the magazine form guides for the picks by engagement with the ends of the fingers as shown. The rear flanges 18 of the magazine guide the body of the pick in a similar manner.

It will be understood and is shown in Figures 2 and 4 that the aforesaid grooves and channels are below the top surface of the bed plate 5 and below the bottom surfaces of the magazine uprights because otherwise the bottom pick could not be pushed out from the magazine. In order therefore to keep the bottom pick in its proper position there is provided a stop pin 20 which projects upwardly in the one finger way groove immediately behind the last or lowermost finger 2 of the stem, using the term lowermost with respect to the position of the stem when it is attached. The pin 20 prevents rearward movement of the bottom pick or movement to the right in Figure 1.

The numeral 22 denotes a gauge which is in the form of a flat piece having a bent down lip 23 and secured by one of the screws 6. The gauge lip 23 dips into the V-groove 7, Figures 2 and 4, and may be adjusted vertically so as to permit only one pick at a time to pass underneath said lip. The adjustment is made by means of the nut 24 on a bolt 25. The nut may have an indicating pointer as shown for setting purposes as will be understood. In front of the gauge lip there is provided a spring 26 which also dips into the V-groove 7, see Figure 3. The spring passes up through the gauge body and is then bent around the stud 25. The spring 26 serves as a retarding means in that it presses down upon the flower pick as the latter is fed out under the gauge lip.

The forward ends 27 of the pusher rods 15 lie immediately behind the two lowermost fingers on the flower stem as seen in Figure 1 and they are held down by springs in the form of paper-thin flat pieces of metal 28 at the bottom of the magazine and which pieces have the inner sides 29 slightly curved so as to press down upon the pusher rods.

The pusher block 14 is moved from its starting position in Figure 1 to the left in the drawings until its forward edge hits the edge 11 of the cut out 12. The block is operated by a lever 30 which is pivoted on a shaft 31 in the base 4 and which extends upward through a hole 32 in the block. The lever forms a handle 33 above the machine and is held in normal retracted position by a spring 34 attached to a headed screw 35 in the lever.

The pusher rods 15 are detachably secured to the pusher block 14 for purposes of convenient replacement and the like. As seen in Figure 2 the rods have lugs 36 engaging holes 37 in the block and may be detached by a simple lifting movement.

In the forward end of the machine there are mounted two cooperating jaws 40 and 41 which are actuated to close the pick fingers 2 around the flower stem. Each jaw, see Figures 5-9, has a plurality of upstanding cams 42 which are spaced to accord with the positions of the stem fingers 2. That is, the cams on the one jaw are spaced to engage the fingers on the one side of the pick and the cams on the other jaw are spaced to engage the fingers on the other side of the pick. The cams on the one jaw enter between the cams on the opposite jaw during the closing operation as is obvious. In addition the jaws are cut out as shown at 43 in Figure 9 to permit interlocking of the jaw bodies 40 and 41. Below the cams 42 and extending inwardly each jaw is further formed with finger supporting and engaging portions 63.

Each jaw is pivoted on a shaft 44 in the base and carries at its lower end a roller 45 engageable by an anvil 46 which is moved upward to spread the lower ends of the jaws and close the upper ends with the cams. When the anvil is withdrawn the jaws are quickly forced apart by means of a spring 47.

Figures 5-8 show the jaws in different positions during the closing operation. The normal position is as in Figure 5 and shows the flower pick 1 in position after it has been fed into the jaw mechanism. Thereafter the operator places the stem 50 of the flower upon the head 3 of the pick and so far in lengthways of the pick as experience has shown is necessary for properly attaching the pick to the flower. It will also be seen that the fingers of the pick rest upon the jaw supporting portions 63.

Figure 6 shows how the jaws begin to close in on the fingers 2, and it will be understood that at this time the fingers are raised slightly, due to the engagement of the lowermost rounded inner surfaces 51 of the cams 42.

Figure 7 shows a still further closing of the jaws and also shows that the curling of the pick fingers has begun to quite some extent.

Figure 8 shows the position of the jaws when the operation has been completed. At this time the anvil 46 has reached its highest position and exerts a yielding pressure against the stretching or opening of the jaw spring 47. The fingers of the flower pick have now been completely closed around the flower stem in a ringlike firm engagement.

The anvil 46 is carried at the forward end of an operating lever 52 which is pivoted on a transverse shaft 53 in the base 4. The lever 52 extends to the rear outside the base and carries a wooden knob 54. The anvil 46 is held in retracted position by a spring 55.

The operation is as follows. The magazine having been loaded with flower picks as in Figures 1 and 2, the operator takes a flower in his left hand and with the ball of the right hand gives a quick leftward blow to the handle 33 of the upright lever 30, thereby actuating the feeding mechanism of the machine to feed the lowermost pick out from under the stack of picks, under the gauge lip 23 and the spring 26 into its stem receiving position on and between the jaws. The feeding stroke is, of course, so arranged that the fingers 2 of the pick come opposite the cams 42 of the jaws. Thereafter the operator places the stem of the flower on top of the pick and with a quick blow on the knob 54 with his right hand moves the anvil upward to operate the jaws as above explained. The operator then removes the stemmed flower.

The operation of the machine is very rapid and is done in much less time than it takes to describe it. Practically the operations occur almost at the same time. The operator does not pause in operating the two levers 33 and 52. His right hand executes a swift leftward and then rightward movement, and the operation is completed.

It sometimes happens that for some reason or another the feeding mechanism becomes gummed or otherwise fails to operate in a clean-cut manner. It is therefore desirable that the jaws be not closed at such a time. Means are therefore provided whereby if the feeding lever 30 can not for some reason complete its forward feeding stroke, it becomes impossible to operate the jaw lever 52. For this purpose the latter is provided with a sideways extending lug 57, which is so placed with relation to the headed screw 35 on the lever 30 that if the latter is not moved completely in, under and past the said lug 57, the latter obviously can not be moved downward; hence the lever 52 can not be operated. In other words, the headed screw 35 constitutes an abutment which, when it occupies a position below the lug 57, prevents lowering of the lever 52 and thus prevents the jaws from being closed. It is a safety feature in the operation of the machine.

It should also be noted that the one pusher rod 15 is longer than the other, not only for the purpose of engaging the lowermost pick fingers 2 at practically the same time but also because thereby a sort of slight twisting motion is given to the lowermost pick, which helps in loosening it from the stack of picks. Another feature that should be noted is that, as seen in Figure 3, the pivot holes in the jaw bodies are slightly flared at the outer ends, as indicated at 85, whereby to obtain a slight rocking movement of the jaws when they close upon the pick fingers 2. This feature imparts a slight elasticity or freedom of movement on the part of the jaws, which is desirable because of the unevenness usually found in flower stems.

The machine illustrated in Figures 10, 11, 12, and 13 differs from the foregoing only in the actuating means for operating the pusher rods 15 and the anvil 46. In these figures the same reference numerals are used as in Figures 1 and 3 to designate corresponding parts. In Figure 11, as compared with Figure 1, it will be seen that the block 14 slides on top of the bed plate 5 and that screws 60 are positioned at the inner ends of the finger ways 9 for the purpose of keeping the forward ends of the pusher rods down in the grooves 8. The spring 61 which dips into the central groove 7 serves the same purpose as the spring 26 in Figure 3.

Figure 13 illustrates how the lower ends of the magazine uprights 62 are cut out as at 64 for the passage of the lowermost pick away from the magazine.

The mechanism for operating the block slide 14 and the anvil 46 is arranged as follows. Within the base 65 the block has a pin 66 which is engaged by the upper end of the forked lever 67 pivoted at 68. The lever carries a pin 69 which is engaged by a cam 70 on the operating shaft 71. To the latter there is pinned a short arm 72 having a stud 73 which normally engages in the hook 74 of a hooked link 75, the upper end of which is pivoted on a bolt 76 in the upper end of the anvil lever 77, which is pivoted on the shaft 53.

The operating shaft 71 has a handle 78. A spring 79 permits yielding play or movement between the hooked link 75 and the anvil lever 77. See Figure 12. In operation the handle 78 is moved away from the machine and the operator in the direction of the arrow 80, Figure 11. This movement of the handle turns the shaft 71 and the cam 70 to operate the feed lever 67, which in turn operates the slide block and pusher rods to feed the flower pick into the jaws. During this movement the stud 73 has been lifted out of the hook 74, and the hooked link 75 and the anvil 77 have not been operated.

Thereafter the operating handle 78 is moved in the opposite direction, whereby the lever 67 is actuated to return the feeding elements to normal position, and now the stud 73 enters the hook 74 to pull down the link 75 to operate the anvil lever 77. The handle is worked quickly with a forward and backward movement to cause the aforesaid operations.

The following advantages may be noted as being characteristic of this invention and the manner of stemming a flower. The compact form of the machine embodies great rigidity and strength and permits rapid operation without requiring any special skill on the part of the operator. The jaw mechanism, being in full view, enables the operator to place the stem accurately upon the flower pick and also to adjust the stem lengthwise of the pick as may be desired. It is obvious that this is a very great advantage, inasmuch as flower stems vary greatly in diameters and also lengthwise adjustment must be provided for, depending upon the nature of the flower to be stemmed and its final use. The yielding, slightly rocking movement of the jaws facilitates the closing stemming operation, even though the flower stem may be uneven or provided with slight bends or burs. The loading of the machine is open, and the stack of flower picks is easily dropped into the magazine and thereby automatically positioned. The length of the pick may vary considerably within the size of the machine, because the feeding stroke is always the same, and the stemmed flower is removed by a lifting, forwardly pulling movement, whereby the pick is easily removed from under magazine.

As pointed out hereabove, it is believed that this invention discloses the first flower stemming machine and that it also for the first time discloses an entirely new method for automatically stemming a flower. It will further be understood that although the invention is disclosed in its preferred form, nevertheless changes and alterations may be made within the scope of the appended claims without involving a material departure from the principle of the invention.

I claim:—

1. A machine for attaching a flower pick to the stem of a flower comprising means for receiving and holding a pick in a predetermined normal position, a jaw mechanism adapted to engage said pick to attach it to the stem of a flower, means for moving the pick from said holding means into operative relation with said jaw mechanism, means for operating the pick moving means, means for operating the jaw mechanism and means preventing the jaw mechanism from being operated when the said pick moving means fail to operate.

2. A machine for attaching a metal flower pick to the stem of a flower, said flower pick having a body portion with attaching fingers at one end thereof, comprising a magazine for holding a stack of flower picks, means in said magazine engaging the said fingers for positioning the picks, a jaw mechanism, means for moving the lowermost flower pick from under the stack of picks a distance to place the said flower pick attaching fingers in operative relation to said jaw mechanism, said flower pick fingers being then fully exposed to view, means for operating the said moving means and means for operating the jaw mechanism to wrap the said attaching fingers around a flower stem.

3. A machine for attaching a metal flower pick to the stem of a flower, said flower pick having a body portion with attaching fingers at one end thereof, comprising a magazine for holding a stack of flower picks, means in said magazine engaging the said fingers for positioning the picks, a jaw mechanism, means for moving the lowermost pick from under the stack of picks a distance to place the said flower pick attaching fingers in operative relation to the said jaw mechanism irrespective of the length of the said flower pick, the fingers being fully exposed in relation to the jaw mechanism, means for operating the said moving means and means for operating the said jaw mechanism.

4. A machine for attaching a metal flower pick to the stem of a flower, said flower pick having a body portion with attaching fingers at one end thereof, comprising a magazine for holding a stack of flower picks, a jaw mechanism, means for moving the lowermost flower pick away from the stack a distance to place the said flower pick attaching fingers in operative and fully exposed relation to the said jaw mechanism, adjustable yielding gauging means preventing other than the lowermost pick to be moved as aforesaid, means for operating said moving means and means for operating the said jaw mechanism.

5. A machine for attaching a metal flower pick to the stem of a flower, said flower pick having a body portion with attaching fingers at one end thereof, comprising a magazine for holding a stack of flower picks with the said attaching fingers within the magazine, a jaw mechanism, means engaging the said attaching fingers for moving the lowermost flower pick from under the stack a distance to place the said attaching flower pick fingers into operative and fully exposed relation to the said jaw mechanism, adjustable means preventing more than one pick at a time from being moved from under the stack of picks as aforesaid, means for operating the said moving means, means for operating the jaw mechanism and means preventing operation of the jaw mechanism if the said pick moving means fail to operate.

CHARLES A. KNUUTILA.